United States Patent
Nettelbland

(10) Patent No.: US 9,013,346 B2
(45) Date of Patent: Apr. 21, 2015

(54) RADAR SYSTEM COMPRISING A SWITCHING MODE POWER CONVERTER

(75) Inventor: Bo Nettelbland, Göteborg (SE)

(73) Assignee: SAAB AB, Linköping (SE)

( * ) Notice: Subject to any disclaimer, the term of this patent is extended or adjusted under 35 U.S.C. 154(b) by 518 days.

(21) Appl. No.: 13/382,118

(22) PCT Filed: Jul. 1, 2009

(86) PCT No.: PCT/SE2009/050852
§ 371 (c)(1),
(2), (4) Date: Jan. 3, 2012

(87) PCT Pub. No.: WO2011/002365
PCT Pub. Date: Jan. 6, 2011

(65) Prior Publication Data
US 2012/0105273 A1 May 3, 2012

(51) Int. Cl.
*G01S 7/484* (2006.01)
*H02M 1/44* (2007.01)
*G01S 7/282* (2006.01)
*H02M 3/156* (2006.01)

(52) U.S. Cl.
CPC ............... *H02M 1/44* (2013.01); *G01S 7/282* (2013.01); *H02M 3/156* (2013.01)

(58) Field of Classification Search
CPC ..... G01S 13/227; G01S 7/282; G01S 13/106; H02M 1/44
USPC ................. 342/82, 134, 137, 175, 199, 200
See application file for complete search history.

(56) References Cited

U.S. PATENT DOCUMENTS

| | | | |
|---|---|---|---|
| 3,760,256 A * | 9/1973 | Rast et al. | 363/47 |
| 3,987,443 A * | 10/1976 | Cross | 342/192 |
| 4,190,882 A * | 2/1980 | Chevalier et al. | 363/26 |
| 6,366,067 B1 * | 4/2002 | Zhang et al. | 323/282 |
| 6,963,302 B2 * | 11/2005 | Arvidsson | 342/134 |
| 7,372,394 B1 * | 5/2008 | Woodell et al. | 342/26 R |
| 2006/0220944 A1 | 10/2006 | Ikeda | |

FOREIGN PATENT DOCUMENTS

| | | |
|---|---|---|
| EP | 0379293 A2 | 7/1990 |
| EP | 0499706 A2 | 8/1992 |
| WO | WO-03/003042 A1 | 1/2003 |

OTHER PUBLICATIONS

PCT/ISA/210-International Search Report-Mar. 15, 2010.
PCT/ISA/237-Written Opinion of the International Searching Authority-Mar. 15, 2010.

(Continued)

*Primary Examiner* — John B Sotomayor
*Assistant Examiner* — Marcus Windrich
(74) *Attorney, Agent, or Firm* — Venable LLP; Eric J. Franklin

(57) ABSTRACT

A radar system including a switching mode power converter. A pulse radar unit is configured to transmit RF pulses with a pulse repetition frequency. The power converter includes a switching controller that is configured to control at least one switching element. The switching controller is configured to receive a frequency modulated input signal. The modulation frequency of the input signal is configured to be derived from the pulse repetition frequency of the radar unit.

13 Claims, 2 Drawing Sheets

(56) References Cited

OTHER PUBLICATIONS

PCT/IPEA/409-International Preliminary Report on Patentability-Jun. 15, 2011.

European Communication dated Jul. 30, 2014, issued in counterpart EP Application No. 09846911.7.

* cited by examiner

RADAR SYSTEM COMPRISING A SWITCHING MODE POWER CONVERTER

CROSS-REFERENCE TO RELATED APPLICATIONS

This application is the national phase under 35 U.S.C. §371 of PCT/SE2009/050853 filed 1 Jul. 2009.

TECHNICAL FIELD

The present invention relates to the field of power supply for radar systems.

BACKGROUND ART

Switched power conversion results in electromagnetic interferences (EMI). To prevent the power conversion from disturbing other electronic equipment, certain requirements for maximum allowed interference levels have to be met. These interferences are measured over a frequency interval. One solution to reduce the interferences to allowable levels is to use filters. Another solution is to spread the energy of the interference over a broad frequency interval, through frequency modulation of the switching frequency. Such a solution is known from U.S. Pat. No. 4,190,882.

The problem with the first solution is that filter components tends to be large and heavy. The problem with the second solution is that, although the amplitude of the spread-out switching frequency band is substantially decreased, the frequency modulated switching still runs the risk of disturbing the function to which the converted power is intended to be used, e.g. a radar function if the modulation frequency is transferred further in the radar system. A radar is intended to discover electromagnetic radiation, and due to the Doppler effect, it is not known which frequency a received signal will have if you have moving objects within the coverage of the radar. The switching frequency or its harmonics or sub harmonics can therefore be mistaken for a moving object.

There is thus a need to accomplish an improved radar system comprising a switching mode power converter, which is not based on large and heavy filter components, and in which the switching frequency or its harmonics or sub harmonics will not be mistaken for a moving object by the radar unit.

SUMMARY

The object of the invention is to provide an inventive radar system, and a method of reducing the noise picked-up by a radar unit and generated by a switching mode power converter, where the previously mentioned problems are avoided. The object is achieved by a radar system comprising a switching mode power converter, wherein a pulse radar unit is configured to transmit RF pulses with a pulse repetition frequency. The power converter further comprises a switching controller, which is configured to control at least one switching element. The switching controller is also configured to receive a frequency modulated input signal, wherein the modulation frequency of said input signal is configured to be derived from the pulse repetition frequency of the radar unit.

The object is further achieved by a method of reducing the noise picked-up by a radar unit and generated by a switching mode power converter, whereby the radar unit transmits RF pulses with a pulse repetition frequency, comprising the steps of:

controlling at least one switching element be means of a switching controller;
supplying a frequency modulated input signal to the switching controller;
and wherein the modulation frequency of said input signal is derived from the pulse repetition frequency of the radar unit.

According to an aspect of the invention, a pulse repetition frequency signal carrying the pulse repetition frequency of the radar unit is configured to be supplied from the radar unit to the power converter.

According to an aspect of the invention, a signal carrying the pulse repetition frequency, or an integer multiple thereof, is supplied to a frequency modulator, which is configured to generate the frequency modulated input signal.

According to an aspect of the invention, the pulse repetition frequency signal is supplied to a first waveform generator, which is configured to generate a modulating signal having a modulating frequency derived from said pulse repetition frequency, and wherein a second waveform generator is configured to generate a base switching signal having a centre frequency, and wherein the base switching signal and the modulating signal are supplied to a frequency modulator, which is configured to generate a frequency modulated input signal having a centre frequency from the base switching signal and a modulation frequency from the modulating signal.

According to an aspect of the invention, the frequency of the pulse repetition frequency signal is configured to be multiplied with an integer n in a frequency multiplier before being supplied to a frequency modulator.

According to an aspect of the invention, the frequency of the pulse repetition frequency signal is configured to be multiplied with an integer n in a frequency multiplier before or after being supplied to a waveform generator, such as to generate a modulating signal having a modulating frequency which is an integer multiple of the pulse repetition frequency.

According to an aspect of the invention, the switching controller is a pulse width modulator.

According to an aspect of the invention, the relationship between the modulating frequency and the centre frequency, which determines the spread of the switching frequency bands, is between 3-15%.

According to an aspect of the invention, the method of reducing the noise picked-up by a radar unit comprises supplying a pulse repetition frequency signal carrying the pulse repetition frequency of the radar unit from the radar unit to the power converter.

According to an aspect of the invention, the method of reducing the noise picked-up by a radar unit comprises supplying the pulse repetition frequency of the radar unit, or an integer multiple thereof, to a frequency modulator, which generates the frequency modulated input signal.

According to an aspect of the invention, the method of reducing the noise picked-up by a radar unit comprises supplying the pulse repetition frequency signal to a first waveform generator, which generates a modulating signal having a modulating frequency derived from said pulse repetition frequency; generating a base switching signal having a centre frequency in a second waveform generator; and supplying the base switching signal and the modulating signal to a frequency modulator, which generates a frequency modulated input signal having a centre frequency from the base switching signal and a modulation frequency from the modulating signal.

According to an aspect of the invention, the method of reducing the noise picked-up by a radar unit comprises multiplying the frequency of the pulse repetition frequency signal with an integer n in a frequency multiplier before supplying said pulse repetition frequency signal to a frequency modulator.

According to an aspect of the invention, the method of reducing the noise picked-up by a radar unit comprises multiplying the frequency of the pulse repetition frequency signal with an integer n in a frequency multiplier before or after supplying said pulse repetition frequency signal to a waveform generator, such as to generate a modulating signal having a modulating frequency which is an integer multiple of the pulse repetition frequency.

BRIEF DESCRIPTION OF THE DRAWINGS

The present invention will now be described in detail with reference to the figures, wherein.

DETAILED DESCRIPTION

Switching mode pulse width modulated AC-DC and DC-DC power converters generate considerable amount of conducted and radiated noise and electromagnetic interference (EMI) at the switching frequency and its harmonics and sub harmonics. If a signal is frequency modulated with a constant modulation frequency, the frequency spectra will comprise the modulation frequency as well as sums and differences between this modulation frequency and integer multiples of the modulation frequency.

Figure 1:
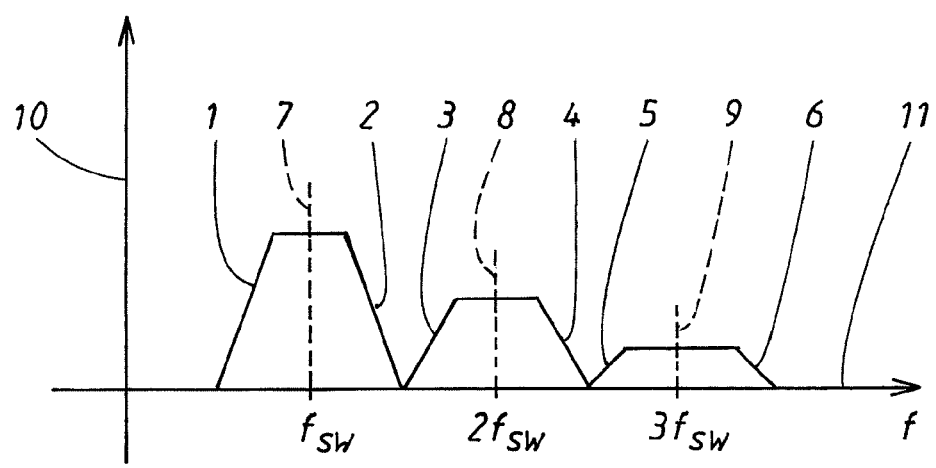
FIG. 1 shows a comparison of an unmodulated switching signal as well as a modulated switching signal in the power spectrum as a function of frequency.

Radiated and conducted EMI noise from the power converter will be picked up by and interfere with the operation of adjacent electrical equipment. The method of frequency modulating the switching frequency of the power converter results in the distribution and spreading of the disturbances over a frequency interval. Spread spectrum switching takes the energy concentrated at a small number of frequency points and deliberately spreads it over a wider band of frequencies. This lowers the average value of the peaks of the currents because the total amount of energy in the wave-forms is the same as before. In practice, a narrow band variation in switching frequency of less than 20% is used and is adequate to realise the benefits of spread spectrum switching. Such a limited variation also allows the design and components of the power converter to remain essentially the same. FIG. 1 shows a comparison of the power in dB on y-axis 10 of an unmodulated switching signal as well as a modulated switching signal in the power spectrum as a function of frequency f on the x-axis 11. Peaks 7, 8, 9 indicate the basic switching frequency including two harmonics of the unmodulated switching signal, whereas lower 1, 3, 5 and upper 2, 4, 6 sidebands centred on said peak switching frequencies $f_{sw}$, $2f_{sw}$ and $3f_{sw}$ indicate the frequency modulated switching signal. The actual spectral composition and shape of the sideband depends on the variation of the modulating frequency as well as on the pulse form. Spread spectrum switching thus decreases the need for heavy and large filter components and reduces frequency concentrated EMI.

Since electromagnetic interference noise will be picked up by and interfere with the operation of adjacent electrical equipment, the switched signal can disturb the function of adjacent electrical equipment to which the converted power is intended to be used.

The invention is based on the finding that when a frequency modulated switched signal is used to regulate a power converter for a pulse radar unit, the receiver of the radar unit can pick up the electromagnetic interference noise from the power converter, and interpret said interference noise as a signal reflected back from an existing physical object even if said object does not exist in reality.

There is consequently a need for the radar unit to remove all received signals having the switching frequency of the power converter to omit any non-existing objects. The inventive idea is here to take advantage of the fact that a radar unit due to its inherent design and function already has points of frequencies which it disregards, namely the pulse repetition frequency PRF and its harmonics and sub harmonics. The PRF can be seen as the sampling clock of the system. The harmonics from the power system will be sampled by this clock.

Any received signal will be folded down to the interval 0 Hz-PRF due to the Nyquist Theorem. If the signal is an integer multiple of the PRF, it will be folded down to 0 Hz. This DC component is filtered and will not be used for target acquisition. Consequently, if the modulation frequency is selected to be identical to the PRF of the radar unit, or an integer multiple thereof, said electromagnetic interference noise from the power converter will be automatically disregarded as well. The switching frequency will therefore neither interfere with the radar unit, nor is there a need for any additional filter components to remove said switching noise.

Figure 2:
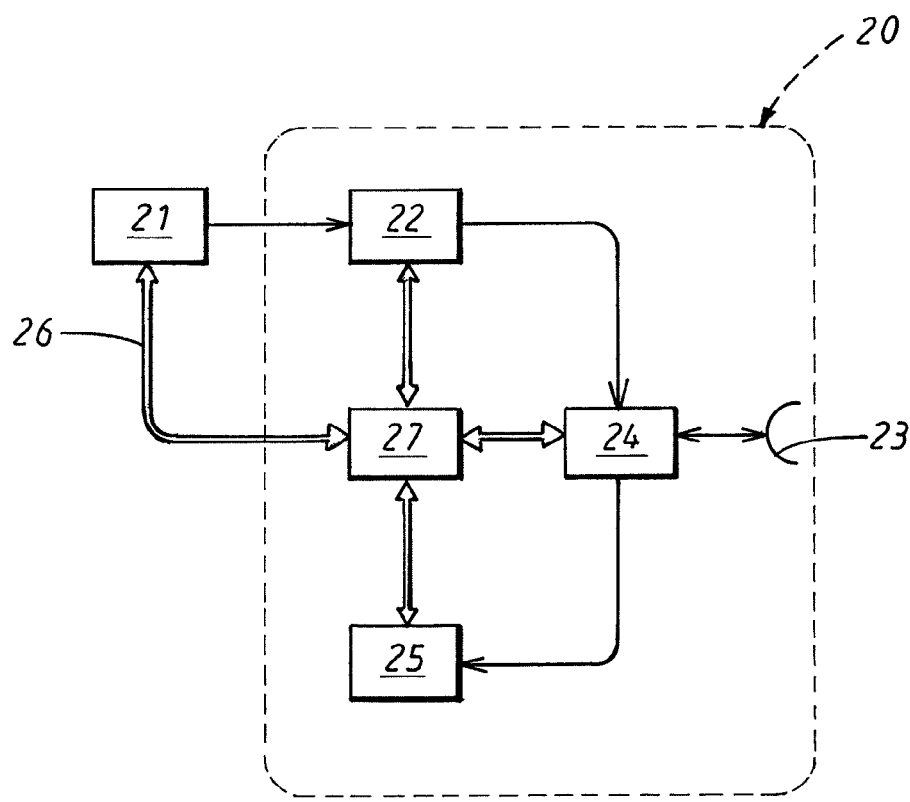
FIG. 2 shows a schematic block diagram of a pulse radar unit according to the invention.

FIG. 2 shows an example of a schematic block diagram of a pulse radar unit 20 according to the invention together with a switching mode power converter 21, which supplies a radar transmitter 22 with power. The power converter can of course supply power to the rest of the radar unit as well. The transmitter 22 generates short duration high-power radio frequency RF pulses of energy that are transmitted via the duplexer 24 to an antenna 23 where they are radiated. The duplexer 24 isolates a receiver 25 from the transmitter 22 while permitting them to share the antenna 23. Through an amplification process and computer processing, the radar receiver 25 produces information about possible indentified objects. The power converter 21, transmitter 22, duplexer 24 and receiver 25 can be controlled by a common control unit 27.

An analogue or digital control connection 26 exists between the control unit 27 and the power converter 21 to convey information about the present PRF. Said control connection can of course also be provided between the transmitter 22 and the power converter 21 instead, or any other equipment of the radar unit having information about the PRF. The PRF is a measure of how frequently the RF pulses are transmitted by the radar transmitter 22. This PRF information is the key to the invention since it forms the basis of the modulating signal used to frequency modulate a centre switching frequency in the power converter 21.

Figure 3:
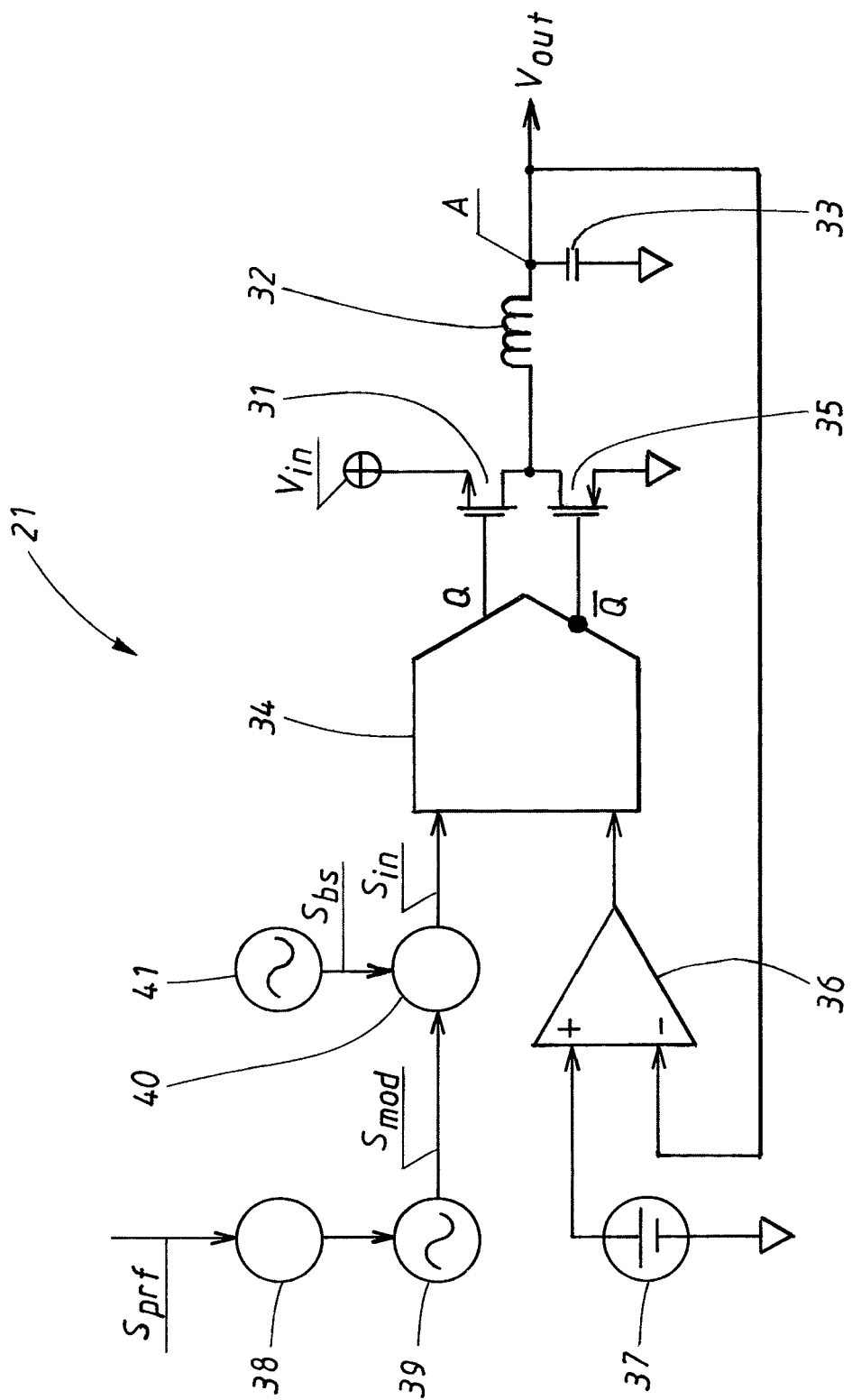
FIG. 3 shows a schematic diagram of the switching mode power converter of FIG. 2 according to an example of the present invention.

FIG. 3 shows a schematic diagram of the switching mode power converter 21 of FIG. 2 according to an example of the present invention. ADC input voltage $V_{in}$ is coupled to the source of an n-channel metal-oxide-semiconductor field effect transistor (nMOSFET) 31, or any other suitable power switching device. This input voltage $V_{in}$ is connected to an output filter, comprising an inductor 32 and a capacitor 33, by control of a pulse width modulator (PWM) 34, which thus functions as a switching controller. Switching controller 34 has a first input configured to accept a frequency modulated input signal $S_{in}$ and a first output Q, which provides a preferably square wave signal, having a duty cycle (i.e. ratio of high time to signal period) that determines a DC voltage level at an output $V_{out}$ located at point A. The preferably square wave signal is coupled to the gate of nMOSFET 31, which is on when the square wave signal is high and off when the square wave signal is low.

During the time nMOSFET 31 is on, the input voltage $V_{in}$ is coupled to the output filter and a voltage is induced across inductor 32. When the square wave signal drops from high to low, nMOSFET 31 turns off and a p-channel pMOSFET 35 turns on. When pMOSFET 35 is on, inductor 32 discharges its energy through the radar transmitter (not shown), which is coupled to the output $V_{out}$. A comparator 36 constantly compares a sample of the voltage at the output $V_{out}$ to a reference voltage 37 and provides a switching controller control signal a second input of the switching controller 34. Switching controller control signal is used by the switching controller 34 to adjust the duty cycle of the square wave signal at the first output Q and second output $\overline{Q}$. Some or all of the above-described components may be integrated in a single integrated circuit.

According to the present invention, the power converter 21 is configured to receive a PRF signal $S_{PRF}$ from the radar unit 20 with information about the pulse repetition frequency PRF of the radar unit 20 for synchronization purpose. The frequency of the PRF signal $S_{PRF}$ may subsequently be multiplied with an integer n in a frequency multiplier 38. The frequency multiplied PRF signal is then supplied to a first waveform generator 39 to generate a modulating signal $S_{mod}$ having a modulating frequency, which is an integer multiple of the PRF. The PRF signal $S_{PRF}$ may of course also be supplied to the first waveform generator 39 before being frequency multiplied with an integer n in a frequency multiplier 38, to generate a modulating signal $S_{mod}$ having a modulating frequency, which is an integer multiple of the PRF. A second waveform generator 41 generates at the same time a base switching signal $S_{bs}$ having a centre frequency.

The base switching signal $S_{bs}$ is finally supplied to a frequency modulator 40 together with the modulating signal $S_{mod}$ to provide a frequency modulated input signal $S_{in}$ having a centre frequency from the base switching signal $S_{bs}$ and a modulation frequency from the modulating signal $S_{mod}$. The frequency modulated input signal $S_{in}$ is subsequently supplied to the switching controller 34 to control the switching frequency of the switching transistors 31, 35.

The frequency multiplication factor n is selected to provide a suitable relationship between the modulating frequency and the centre frequency, as this relationship determines the spread of the switching frequency bands. Too high spread has detrimental effect on the controllability of the pulse width modulation, whereas too low spread has little effect on reducing the interference peaks in the power spectrum. As mentioned above, variation in switching frequency of less than 20% is adequate to realise the benefits of spread spectrum switching. Preferably, the variation in switching frequency is between 3-15% to find a balanced solution, where the negative effect of too high and too low variation is minimised. For example, the control signal $S_{PRF}$ to the power converter 21 from the radar unit 20 consists of a 4 kHz signal, which may be frequency multiplied with a factor 3 in the frequency multiplier 38 to become a 12 kHz modulating signal $S_{mod}$. The base switching signal $S_{bs}$ can have a centre frequency of 150 kHz, which yields a switching frequency spread of 8% of the frequency modulated input signal $S_{in}$.

The power converter 21 in FIG. 2 is supplied with DC input voltage $V_{in}$, but can alternatively be supplied with any type of alternating current AC. If AC is supplied, an input rectifier filter (not shown), possibly represented by a bridge rectifier, can be provided before the nMOSFET 31, such that the rectified AC is supplied to the nMOSFET. Additionally, the switched power pulses can also be supplied to a step-up high voltage transformer (not shown) so as to attain a higher level of power supply.

The schematic diagrams depicted in FIGS. 2 and 3 are not restricting the invention to exactly the shown configuration. For example is it not necessary to represent the function or functions of each block present in FIG. 2 by a separate block, but said functions may be included within a more complex block, or divided into a plurality of more simple blocks. Correspondingly, the topology of the power converter shown in FIG. 3 is only for illustrative purposes, and the present invention is equally applicable to any other type of power converter topology, of which numerous types are known from the prior art, for example Buck, Boost, Forward, Full bridge etc. Possible converter configurations are AC-AC, AC-DC, DC-AC and DC-DC. The principles of the invention are equally applicable to both voltage and current regulation. The invention is consequently not limited to the examples described above, but may vary freely within the scope of the amended claims.

The invention claimed is:

1. A radar system, comprising:
   a switching mode power converter, and
   a pulse radar unit configured to transmit RF pulses with a pulse repetition frequency, and
   wherein the power converter comprises a switching controller, which is configured to control at least one switching element, wherein the switching controller is configured to receive a frequency modulated input signal, such that generated and conducted EMI from the power converter is spread over a frequency interval, and wherein the modulation frequency of said input signal is configured to be derived from the pulse repetition frequency of the radar unit,
   wherein the pulse repetition frequency signal is supplied to a first waveform generator, which is configured to generate a modulating signal having a modulating frequency derived from said pulse repetition frequency, and wherein a second waveform generator is configured to generate a base switching signal having a center frequency, and wherein the base switching signal and the modulating signal are supplied to a frequency modulator, which is configured to generate a frequency modulated input signal having a center frequency from the base switching signal and a modulation frequency from the modulating signal.

2. The radar system according to claim 1, wherein a pulse repetition frequency signal carrying the pulse repetition frequency of the radar unit is configured to be supplied from the radar unit to the power converter.

3. The radar system according to claim 1, wherein a signal carrying the pulse repetition frequency, or an integer multiple thereof, is supplied to a frequency modulator, which is configured to generate the frequency modulated input signal.

4. The radar system according to claim 1, wherein the relationship between the modulating frequency and the center frequency, which determines the spread of the switching frequency bands, is between 3-15%.

5. The radar system according to claim 1, wherein the frequency of the pulse repetition frequency signal is configured to be multiplied with an integer n in a frequency multiplier before being supplied to a frequency modulator.

6. The radar system according to claim 1, wherein the frequency of the pulse repetition frequency signal is configured to be multiplied with an integer n in a frequency multiplier before or after being supplied to a waveform generator, so as to generate a modulating signal having a modulating frequency which is an integer multiple of the pulse repetition frequency.

7. The radar system according to claim 1, wherein the switching controller is a pulse width modulator.

8. A method of reducing noise picked-up by a radar unit and generated by a switching mode power converter, whereby the radar unit transmits RF pulses with a pulse repetition frequency, the method comprising:
controlling at least one switching element with a switching controller;
supplying a frequency modulated input signal to the switching controller, such that generated and conducted EMI from the power converter is spread over a frequency interval,
supplying the pulse repetition frequency signal to a first waveform generator, which generates a modulating signal having a modulating frequency derived from said pulse repetition frequency;
generating a base switching signal having a center frequency in a second waveform generator; and
supplying the base switching signal and the modulating signal to a frequency modulator, which generates a frequency modulated input signal having a center frequency from the base switching signal and a modulation frequency from the modulating signal,
wherein the modulation frequency of said input signal is derived from the pulse repetition frequency of the radar unit.

9. The method according to claim 8, further comprising:
supplying a pulse repetition frequency signal carrying the pulse repetition frequency of the radar unit from the radar unit to the power converter.

10. The method according to claim 8, further comprising:
supplying the pulse repetition frequency of the radar unit, or an integer multiple thereof, to a frequency modulator, which generates the frequency modulated input signal.

11. The method according to claim 8, wherein the relationship between the modulating frequency and the center frequency, which determines the spread of the switching frequency bands, is between 3-15%.

12. The method according to claim 8, further comprising:
multiplying the frequency of the pulse repetition frequency signal with an integer n in a frequency multiplier before supplying said pulse repetition frequency signal to a frequency modulator.

13. The method according to claim 8, further comprising:
multiplying the frequency of the pulse repetition frequency signal with an integer n in a frequency multiplier before or after supplying said pulse repetition frequency signal to a waveform generator, so as to generate a modulating signal having a modulating frequency which is an integer multiple of the pulse repetition frequency.

* * * * *

UNITED STATES PATENT AND TRADEMARK OFFICE
CERTIFICATE OF CORRECTION

| | | |
|---|---|---|
| PATENT NO. | : 9,013,346 B2 | Page 1 of 1 |
| APPLICATION NO. | : 13/382118 | |
| DATED | : April 21, 2015 | |
| INVENTOR(S) | : Bo Nettelblad | |

It is certified that error appears in the above-identified patent and that said Letters Patent is hereby corrected as shown below:

Title page item 75 Inventor name should read

Bo Nettelblad

Signed and Sealed this
Twenty-ninth Day of September, 2015

Michelle K. Lee
*Director of the United States Patent and Trademark Office*